United States Patent [19]

Hay, II

[11] Patent Number: 4,631,016
[45] Date of Patent: Dec. 23, 1986

[54] FILM CASTING APPARATUS INCLUDING HEAT TRANSFER ROLL

[75] Inventor: Robert A. Hay, II, Midland, Mich.

[73] Assignee: The Dow Chemical Company, Midland, Mich.

[21] Appl. No.: 781,814

[22] Filed: Sep. 30, 1985

[51] Int. Cl.[4] ............................................. B29C 39/38
[52] U.S. Cl. ...................................... 425/224; 165/89; 425/365; 425/377; 425/378 R
[58] Field of Search ................... 425/223, 363, 378 R, 425/377, 365, 224; 165/89, 90, 91

[56] References Cited

U.S. PATENT DOCUMENTS

| | | | |
|---|---|---|---|
| 1,080,455 | 12/1913 | Jensen | 165/90 |
| 1,994,360 | 3/1935 | Hurxthal | 165/90 |
| 3,216,489 | 11/1965 | Norton | 165/89 H |
| 3,477,500 | 11/1969 | Sear | 165/89 |
| 3,709,647 | 1/1973 | Barnhart | 425/365 |
| 3,712,366 | 1/1973 | Gerding | 165/89 |
| 3,729,180 | 4/1973 | Bourrel et al. | 165/90 |
| 4,229,644 | 10/1980 | Namiki et al. | 165/89 H |
| 4,440,214 | 4/1984 | Wedel | 165/90 |
| 4,476,637 | 10/1984 | Justus et al. | 165/90 |

Primary Examiner—Willard E. Hoag
Attorney, Agent, or Firm—R. B. Ingraham

[57] ABSTRACT

An improved heat transfer or chill roll is disclosed employing a static mandrel, and agitation within the roll together with longitudinal distribution of the heat exchange fluid provides increased uniformity of surface temperature.

8 Claims, 6 Drawing Figures

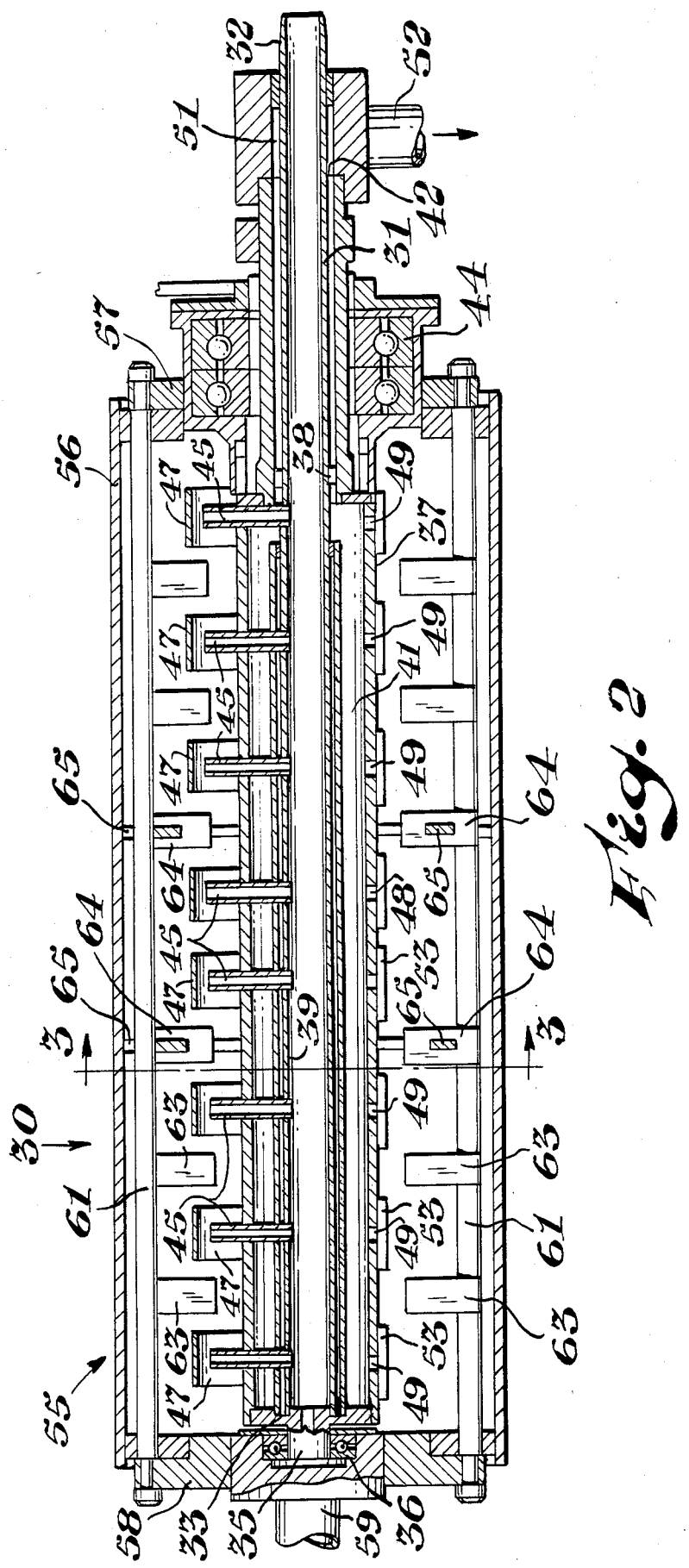

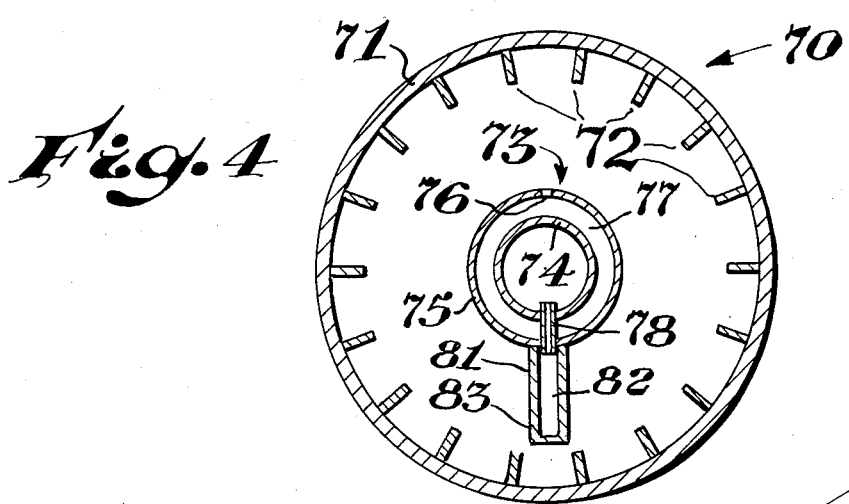
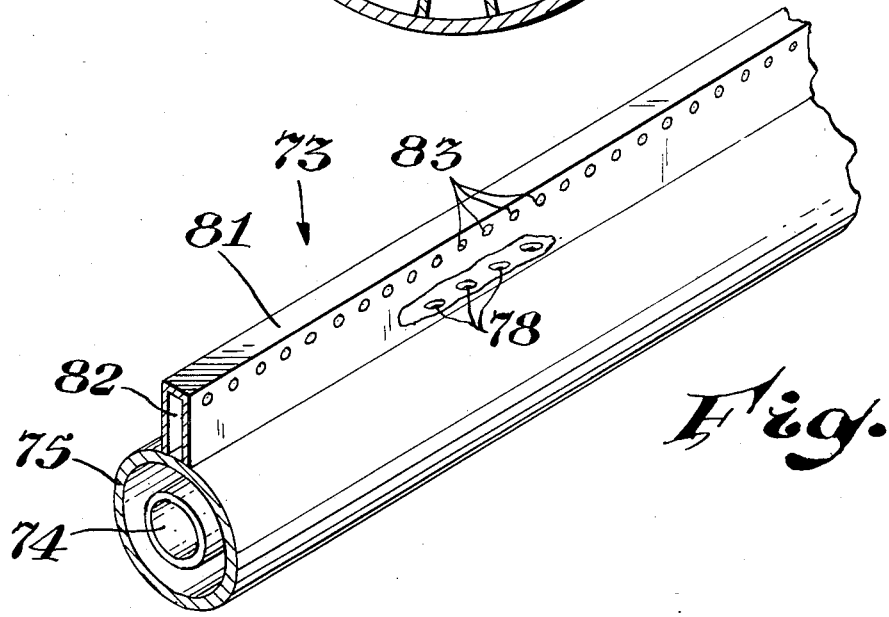
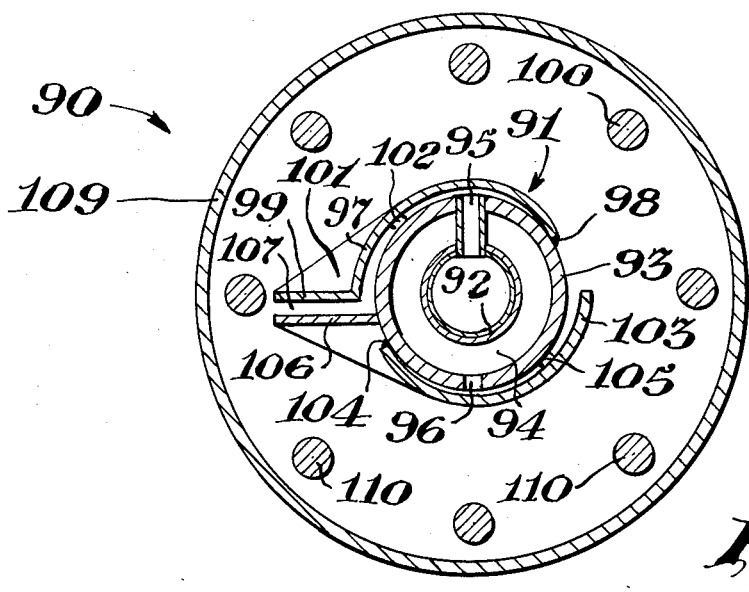

FILM CASTING APPARATUS INCLUDING HEAT TRANSFER ROLL

Oftentimes it is desirable to employ a heat transfer roll to transfer heat to or from a sheet or film-like article. One such application is the chill roll casting of synthetic resinous film, such as polyethylene, polypropylene and the like heat plastifiable resinous materials. Such a chill roll may have a highly polished surface or a mat surface depending upon the desired end product. Frequently a synthetic resinous film is stretched after it has been removed from the surface of the chill roll. Whether or not the film is stretched it is desirable that the thickness be as uniform as possible. One source of nonuniformity is in the die from which the material is extruded. A second source of nonuniformity is a heat transfer roll or chill roll whose surface temperature is not uniform. Such nonuniformities are highly undesirable as when the film is wound onto a mill roll or large roll, nonuniformities frequently appear as bands and result in a noncylindrical roll which for most purposes is highly undesirable.

It is an object of this invention to provide an improved chill roll.

It is also an object of this invention to provide an improved chill roll having improved temperature uniformity.

It is also an object of this invention to provide an apparatus for the preparation of film incorporating such an improved chill roll.

These features and other advantages in accordance with the present invention are achieved in a heat transfer roll, the heat transfer roll comprising a static mandrel having a longitudinal axis, a drive end and a heat transfer fluid end; the mandrel having a centrally disposed heat transfer passage, the mandrel having a first bearing mounted external thereto adjacent the heat transfer fluid end and a second bearing mounted adjacent the drive end; a heat transfer fluid jacket surrounding the mandrel between the bearings, a plurality of generally radially extending axially spaced conduits disposed between the bearings and providing communication between the heat transfer passageway within the mandrel and space external to the jacket, the jacket defining a plurality of axially spaced passageways which provide communication between space external to the jacket and a generally annular space disposed between the jacket and the mandrel, means external to the mandrel to provide passage of the heat transfer liquid to space internal to the mandrel and means to provide communication between the annular space between the mandrel and the jacket and space external to the mandrel, a cylindrical rotatable roll member disposed external to the jacket and rotatably supported on the bearings; the roll member defining a plurality of internal baffles, the roll member being free to rotate on the bearings.

These benefits and other advantages of the present invention will become more apparent from the following specification taken in connection with the drawing wherein:

FIG. 2 is a sectional view of one embodiment of a heat transfer roll in accordance with the present invention;

FIG. 4 is a cross sectional view of an alternate roll in accordance with the present invention;

FIG. 5 is a fractional isometric representation of the mandrel employed in the roll in FIG. 4; and FIG. 6 is a cross sectional view of a different roll in accordance with the present invention.

Figure 1:
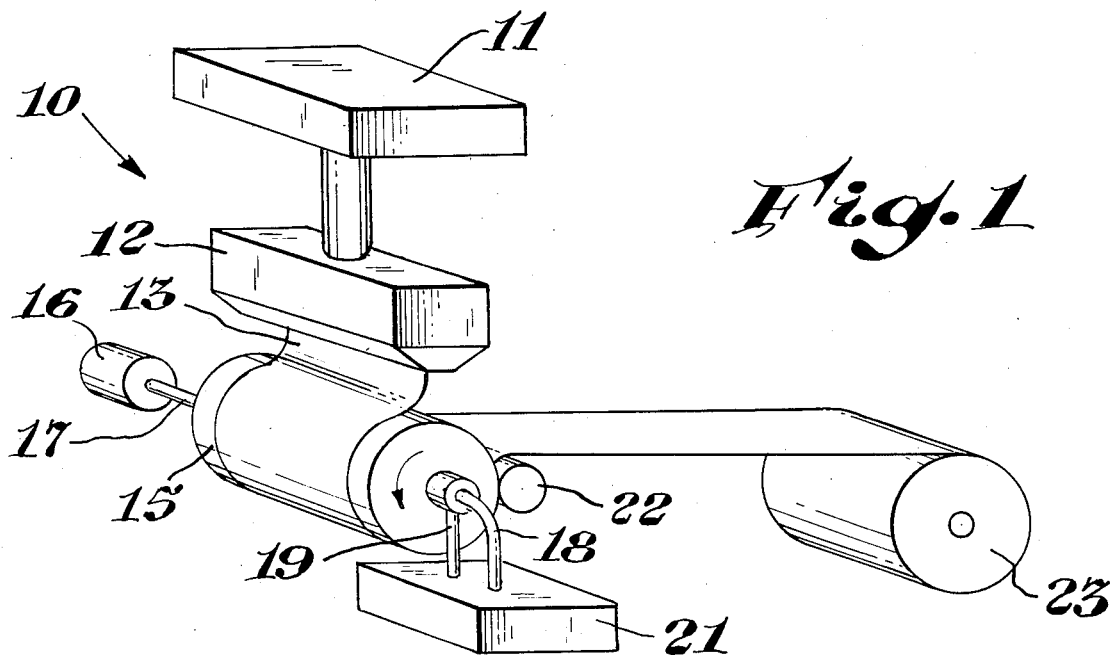
FIG. 1 is a schematic representation of an apparatus employing a heat transfer roll in accordance with the present invention.

In FIG. 1 there is depicted a schematic isometric view of an apparatus in accordance with the present invention generally designated by the reference numeral 10. The apparatus 10 is a film extrusion assembly comprising an extruder 11 having attached thereto a slot or sheeting die 12. The sheeting die 12 is extruding synthetic resinous film 13 onto a heat transfer or chill roll 15. The chill roll 15 is rotated in the direction indicated by the arrow by a motor 16 connected to the roll by means of a drive shaft 17. The roll 15 has a static mandrel 16 having connected thereto a heat transfer supply conduit 18 and a heat transfer liquid discharge 19. The supply 18 and discharge 19 are in operative combination with a liquid temperature control means 21. The film 13 wraps about the heat transfer roll 15 for about 270° and passes over a roll 22 driven by means not shown. The film then is wound onto a mill roll 23 supported and rotated by means not shown. In operation of the apparatus 10, synthetic resinous material is heat plastified in extruder 11, passed from the extruder 11 to the slot or sheeting die 12 and is discharged in the form of film 13 which is cooled as it passes over the roll 15 and receives additional cooling as it passes from roll 22 to roll 23.

In FIG. 2 there is depicted a longitudinal sectional view of a heat transfer roll in accordance with the present invention generally designated by the reference numeral 30. The roll 30 comprises a static mandrel 31 of hollow elongate configuration. The mandrel 31 has a supply end 32 and a drive end 33. The drive end 33 is closed by means of a cap 35 having affixed thereto a bearing 36. Disposed about the mandrel 31 is a jacket member 37. The jacket member 37 adjacent the supply end decreases in diameter. The jacket member 37 is affixed to the cap 35 in a generally liquid tight engagement. The jacket member 37 adjacent the supply end 32 of the mandrel 31 is spaced from the mandrel by a plurality of spacers 38 which permit longitudinal flow. The mandrel has disposed thereabout an insulating jacket 39 of substantially lesser diameter than the inner diameter of the jacket 37 and extends from the cap 35 to a location generally adjacent the spacers 38. The mandrel 31, jacket 39 and jacket 37 define a generally annular space therebetween designated by the reference numeral 41. The space 41 is in communication with a discharge space 42 at the supply end of the mandrel 31 by means of spaces between the spacers 38 not shown. A second bearing 44 is disposed adjacent the supply end 32 of the mandrel 31 and is supported by the jacket 37. A plurality of conduits 45 extends radially outwardly from the mandrel 31 through jacket 39, through jacket 37, and provides communication between the interior of the mandrel 31 and space exterior to the jacket 37. Each conduit 45 has associated therewith a generally U-shaped baffle 47 affixed to the jacket 37. The jacket 37 defines a plurality of passageways 49. The passageways 49 generally correspond in location to the conduits 45 and provide communication between space external to the jacket 37 and the annular space 41 between the mandrel 31 and mandrel jacket 39 and the jacket 37.

Affixed to the mandrel 31 and jacket 37 at the supply end of mandrel 31 is a generally annular chamber 51 which is in communication with passageway 42 and a discharge conduit 52. A second plurality of baffles 53 are affixed to the jacket 37 and as depicted in FIG. 2 are largely hidden. A roll assembly is rotatably mounted on bearings 36 and 44. The roll assembly is generally designated by the reference numeral 55. The roll assembly 55 comprises a cylindrical roll member 56 having a first end plate assembly 57 in sealing engagement with bearing 44 and a second end plate assembly 58 in engagement with bearing 36. The second end plate assembly 58 has affixed thereto a drive shaft 59. Four bars 61 extend the length of the roll assembly 55 and terminate external to the end plates 57 and 58. Each of the bars has supported thereon a plurality of baffles 63. The baffles 63 are positioned so as to interdigitate with the baffles 47 and 53 of the mandrel assembly. Baffles affixed to the rods 61 and indicated by the numbers 64 have in association therewith a spacer plate 65 partially shown.

Figure 3:
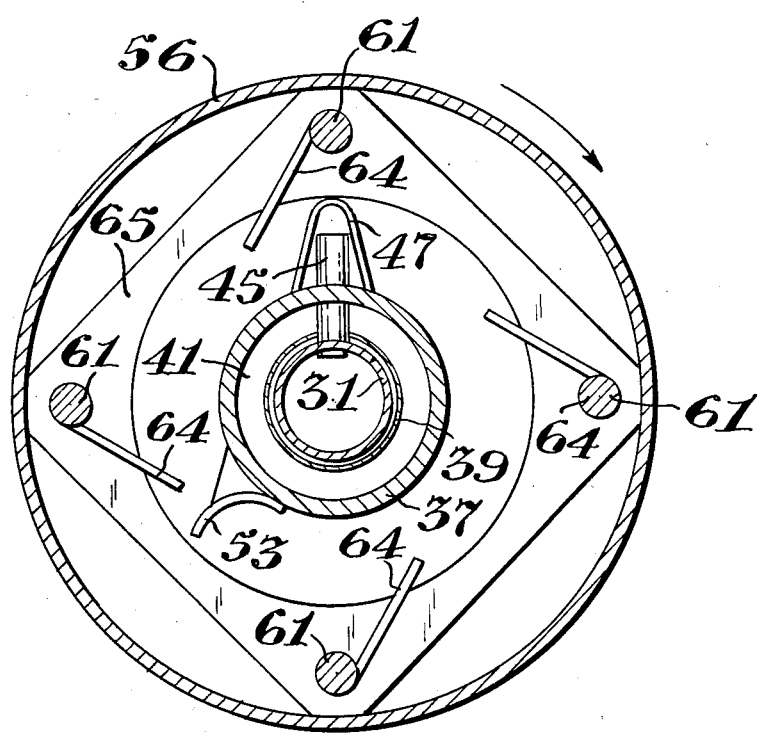
FIG. 3 is a cross sectional view of the roll of FIG. 2 taken along the line 3—3.

In FIG. 3 there is depicted a sectional view of the roll of FIG. 2 taken along the line 3—3 thereof showing the relationship between cylinder 56, spacer plate 65, baffles 64, rods 61 and the mandrel assembly comprising the mandrel 31, mandrel jacket 39, jacket 37, conduit 45 and their associated baffle 47 and baffle 53. As depicted in FIG. 3, the roll employs 4 rods 61, each carrying baffles 64.

In operation of the roll of FIGS. 2 and 3, desirably the mandrel assembly is supported at the supply end 32 in a nonrotating fashion. Liquid is supplied from end 32 to the hollow mandrel 31, is discharged through the conduits 45 into space between the mandrel assembly and the roll assembly 55. The drive shaft 59 is rotated, agitating the heat transfer liquid by means such as the baffles 47, 63, 64 and 53. Liquid then is discharged from the roll assembly by passage through the openings 49 into the annular space 41 from the annular chamber 51 through a passage 42 and is discharged from conduit 52.

In FIG. 4 there is schematically represented a cross section of a heat transfer roll generally designated by the reference numeral 70. The roll 70 comprises a generally cylindrical rotatable portion 71 having affixed to the inner surface thereof axially and radially extending baffles 72. A nonrotating mandrel assembly 73 is centrally disposed within the roll portion 71. The mandrel assembly comprises an inner hollow or supply mandrel 74 generally coaxially disposed within the roll 71. A jacket 75 of circular cross sectional configuration generally is coaxially disposed about the conduit or mandrel 74, the jacket 75 defining a plurality of radially extending passageways 76, only one shown, which provides communication between the space external to the jacket 75, the space 77 lying between the jacket 75 and the mandrel 74. A plurality of conduits 78 provides communication between the space enclosed by mandrel 74 and space external to the jacket 75, only one such conduit shown. A channel member 81 extends axially and is affixed to the jacket 75. The channel member 81 defines an internal space 82. The conduits 78 terminate within the space 82. The channel member 81 defines a plurality of discharge openings 83, only one shown, which discharge in a generally circumferential direction relative to roll 71.

In FIG. 5 there is shown a fractional isometric view of the mandrel assembly 73 of FIG. 4 showing the general configuration thereof.

In FIG. 6 there is depicted a cross sectional representation of an alternate embodiment of the present invention generally designated by the reference numeral 90. The embodiment 90 comprises a mandrel assembly 91. The mandrel assembly 91 comprises a first or inner conduit 92 disposed within a second or outer conduit 93. The conduits 92 and 93 define a space 94 therebetween. A plurality of conduits 95 extends between space internal to conduit 92 and external to conduit 93. Conduit 93 defines a plurality of openings 96 which provides communication between space 94 and space external to the conduit 93. A first elongate arcuate baffle 97 is affixed to conduit 93 at a location generally adjacent conduits 95. The baffle 97 is in liquid tight engagement with conduit 93 by means of a weldment 98. The baffle 97 is spaced from conduit 95 adjacent the external wall of conduit 93. The baffle 97 has affixed to the arcuate position thereof remote from the weldment 98 a planar rectangular portion 99 generally radially extending relative to conduits 92 and 93. A plurality of bracket members 101 rigidify the rectangular member 99. Generally adjacent conduits 95 is an elongate perforate spacer 102 between the baffles 97 and the conduit 93. The spacer 102 is generally adjacent the conduit 95 and remote from the weldment 98. A second arcuate baffle 103 is affixed to conduit 93 by means of a weld 104. The arcuate baffle is affixed to conduit 93 at a location about diametrically opposed from the weld 98. The baffle 103 passes over the openings 96 and is spaced from conduit 93 by means of a perforate spacer 105, the spacer being disposed generally adjacent the opening 96 and remote from the weldment 104. A generally rectangular plate member 106 is affixed to conduit 93 at a location such that is parallel and generally coextensive with plate member 99. The plate members 99 and 106 define a generally slot-like passage 107 therebetween. Disposed about the static mandrel assembly 91 is a roll 109 having 8 tie-agitator bars 110 generally symetrically disposed therein.

In operation of the roll assembly 90 of FIG. 6, liquid is fed to conduit 92, passes through conduit 95 into the space between the baffle 97 and conduit 93, through the perforate spacer 102, between the conduit 93 and the baffle 97 to the generally rectangular passage 107, and is discharged generally radially outward. Beneficially the area for liquid flow presented between perforate baffle is less than the area for liquid flow provided by the conduits 95. Thus the major pressure drop encountered by a fluid entering the system is through the perforate baffle which tends to promote uniformity of flow. Liquid is discharged by passing between the baffle 103, conduit 93 through the perforate spacer 105, through the passages 96 and into the space 94, and discharges through means not shown.

Employing heat transfer rolls in accordance with the present invention provides a high degree of temperature and uniformity in the roll is particularly desirable in the chill roll casting of synthetic resinous film and sheet.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A heat transfer roll, comprising a static mandrel having a longitudinal axis, a drive end and a heat transfer fluid end; the mandrel having a centrally disposed heat transfer passage, the mandrel having a first bearing mounted external thereto adjacent the heat transfer fluid end and a second bearing mounted adjacent the drive end; a jacket for heat transfer fluid surrounding the mandrel between the bearings, a plurality of generally radially extending axially spaced conduits disposed between the bearings and providing communication between the heat transfer passageway within the mandrel and space external to the jacket, the jacket defining a plurality of axially spaced passageways which provide communication between space external to the jacket and a generally annular space disposed between the jacket and the mandrel, means external to the mandrel to provide passage of the heat transfer liquid to space internal to the mandrel and means to provide communication between the annular space between the mandrel and the jacket and space external to the mandrel, a cylindrical rotatable roll member disposed external to the jacket and rotatably supported on the bearings; the roll member defining a plurality of internal baffles, the roll member being free to rotate on the bearings.

2. The apparatus of claim 1 including a plurality of baffles disposed external to the jacket.

3. The roll of claim 2 wherein the baffles are in association with the generally radially extending axially spaced conduits.

4. The roll of claim 3 including a second set of axially spaced baffles disposed external to the jacket and remotely disposed from the baffles in association with the radially extending conduits.

5. The roll of claim 2 wherein the roll member internal baffles interdigitate with the baffles on the jacket.

6. The roll of claim 1 in operative combination with an extruder and a sheeting die.

7. The roll of claim 1 wherein the baffles with the roll member are generally radially extending.

8. The roll of claim 1 wherein the generally radially extending conduits discharge into a channel shaped member affixed to and disposed external to the jacket, the channel member defining a plurality of passages generally remote from the jacket providing communication between space internal to the channel and space external to the channel.

* * * * *